(12) United States Patent
Santilli

(10) Patent No.: US 6,370,689 B2
(45) Date of Patent: Apr. 9, 2002

(54) INTERACTIVE TELEVISION

(75) Inventor: Daniele Santilli, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/306,961

(22) Filed: May 7, 1999

(30) Foreign Application Priority Data

May 8, 1998 (EP) .............................................. 98201512

(51) Int. Cl.[7] .................................................. H04N 7/08
(52) U.S. Cl. ........................ 725/137; 725/138; 725/139; 348/467; 348/468; 348/473
(58) Field of Search ............................ 348/7, 9, 10, 12, 348/13, 461, 468, 552, 563, 460; 455/4.1, 4.2, 5.1; 709/217; 725/1, 137, 20, 38, 106, 139, 110, 138

(56) References Cited

U.S. PATENT DOCUMENTS

| 4,388,645 A | * | 6/1983 | Cox et al. ..................... 358/147 |
| 4,719,510 A | * | 1/1988 | Kinghorn ..................... 358/147 |
| 4,992,871 A | * | 2/1991 | Bensch et al. .............. 358/142 |
| 5,283,648 A | * | 2/1994 | Jeong .......................... 358/22 |
| 5,794,115 A | * | 8/1998 | Saito .............................. 725/1 |
| 5,821,982 A | * | 10/1998 | Santilli et al. ................ 348/13 |
| 5,936,661 A | * | 8/1999 | Trew ........................... 348/13 |

FOREIGN PATENT DOCUMENTS

| EP | 0396062 A2 | 11/1990 | .......... H04N/7/173 |
| WO | WO9638984 | 12/1996 | .......... H04N/7/173 |

* cited by examiner

Primary Examiner—Andrew Faile
Assistant Examiner—Hai V. Tran
(74) Attorney, Agent, or Firm—Laurie E. Gathman

(57) ABSTRACT

An interactive television system for selectively retrieving video images or teletext pages from a remote transmitter (1). User requests are communicated to the transmitter through the telephone network (5). The selected images (e.g., teletext pages) are provided with an image address (a personal teletext page number) and transmitted through a broadcast medium (4). A broadcast receiver (6) captures, stores and displays images having a particular address in a further autonomous manner. In order to prevent co-viewers from tracing the image address and thus watching personal information intended for an individual user on their broadcast receivers (3), the image address is modified whenever a new image is transmitted. Prior to transmitting the image, the address is communicated to the individual user through the telephone network and applied (84,61) to the broadcast receiver.

6 Claims, 2 Drawing Sheets

INTERACTIVE TELEVISION

BACKGROUND OF THE INVENTION

1. Field of the Invention

The invention relates to a method of transmitting images from a transmitter to an individual receiver, comprising the steps of establishing a communication path between said receiver and the transmitter to obtain user selections identifying the images to be transmitted, assigning an image address to the images to be transmitted, and broadcasting each image along with said image address through a broadcast medium.

The invention also relates to a corresponding method of receiving such images from a transmitter.

2. Description of the Related Art

A known interactive television transmission system is disclosed in International Patent Application WO 96/38984, corresponding to U.S. Pat. No. 5,821,982. In this prior-art system, the images are teletext pages. A user establishes a connection with a service provider via a communication path (often a telephone connection). The user's television receiver is tuned to a predetermined television station and set in the teletext mode. The service provider informs the user, by conventional speech, of a personal teletext page number and requests him to enter this number on his hand-held remote control unit. Subsequently, every time the user requests a new piece of information by means of the telephone keys, the requested page is updated and transmitted with the assigned personal page number. The receiver is arranged to continuously acquire the teletext page having said personal page number. Accordingly, whenever the page is updated and retransmitted, it will be captured and displayed by the receiver.

The teletext page for an individual user and similar pages for further individual users are transmitted along with other teletext pages constituting a regular teletext service. Other users may tune to the same transmitter and try to trace the personal page number of an interactively operating user. Since a teletext page number has a limited range (100–899) and the page numbers of the regular teletext service are known, it is not so difficult to trace such a personal page number. In order to reduce the risk that personal teletext pages appear on the display screen of "co-viewers", the prior art patent application teaches the feature of extending the personal page number with a sub-code. By broadcasting a pseudo-page having the same page number but a different sub-code immediately after transmitting each personal page, the personal page appears on the display screen of a co-viewer's receiver only for a short time.

As long as the use of interactive teletext is limited to playing a game or offering more general information, "co-viewing" is no practical drawback. However, an interactive teletext application offering personal information should be well protected against the risk of "co-viewing".

The invention is not restricted to transmission of teletext pages. It is also possible to transmit video images at the standard television resolution. An example of such an interactive still image distribution system is disclosed in European Patent Application EP-A-0 396 062, corresponding to U.S. Pat. 5,014,125. A multiplicity of still video images requested by various users is transmitted as a standard television signal. Each image is encoded with an address identifying the user for whom it is intended. In this known system, the address is determined by the user terminal and communicated to the service provider through the telephone line. "Co-viewing" is not possible as long as all user terminals have different addresses.

SUMMARY OF THE INVENTION

It is an object of the invention to provide a method and arrangement for interactively transmitting and receiving images which further reduces the risk of "co-viewing".

To achieve this object, the method in accordance with the invention comprises the step of communicating the assigned image address to tile receiver through the communication path prior to broadcasting the respective image. The corresponding receiving method is characterized by receiving the image address through said communication path, and applying said image address to the broadcast receiver prior to receiving each image.

The invention allows the image address to be dynamically modified by the transmitter. The modified address is communicated to the individual receiver only. In an interactive teletext system, this means that the sequence of personal teletext pages for an individual user is transmitted with different page numbers. The receiver automatically changes the requested teletext page number under the control of the remote service provider whenever a new page is about to be received. The addressed user does not notice this. He even does not need to enter a page number anymore, whereas a "co-viewer" can at most receive a single page of the sequence.

It is to be noted that remote control of a receiver by a service provider through the communication path is known per se from the afore-cited European Patent Application EP-A-0 396 062. The service provider can send a control message to the user terminal to instruct the television receiver to tune to an alternative channel if the predetermined channel lacks capacity. However, this control message does not modify the address assigned to the image and does not reduce the risk of "co-viewing".

In a practical embodiment of the receiver, the communication means (usually an interface to the public switched telephone network) may be integrated in a television receiver. However, to allow conventional television receivers to be used for accessing an interactive (teletext) service, the communication means may be a separate interface box comprising an (infrared) output for applying the image address in the form of conventional remote control commands.

DESCRIPTION OF THE PREFERRED EMBODIMENTS

The invention will now be explained with reference to an interactive teletext service in which selected teletext pages are transmitted to individual users. It is recalled, however, that the invention equally applies to other services, such as the transmission of still video images described in EP-A-0 396 062.

Figure 1:
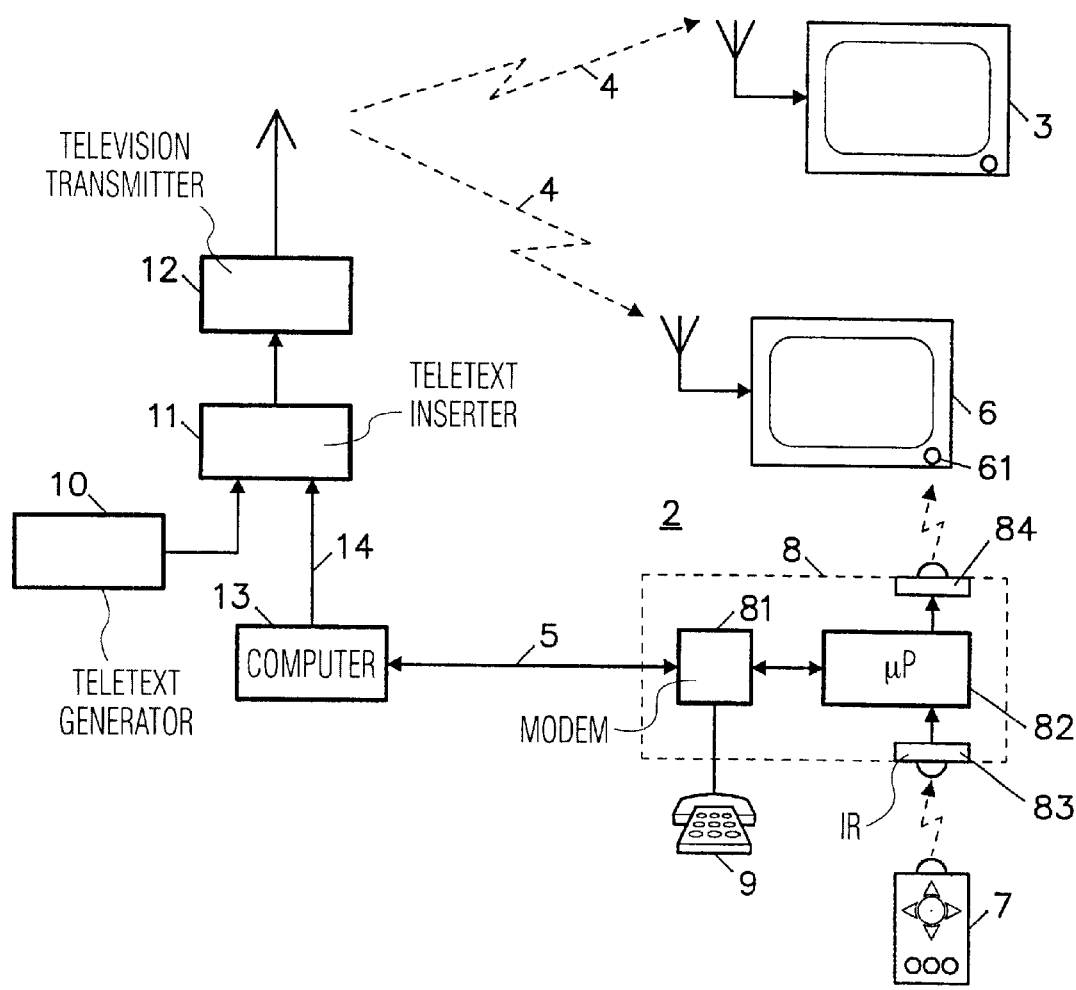
FIG. 1 shows a system to explain the method in accordance with the invention.

FIG. 1 shows a preferred embodiment of a system for carrying out the method in accordance with the invention.

The system comprises a transmitter 1 and an individual receiver 2. A conventional television receiver 3 representing a "co-viewer" is also shown in this Figure. "Conventional" here means that the receiver has a teletext decoder and is arranged to capture and display teletext pages having a page number that has been entered by the user.

The transmitter 1 comprises a teletext generator 10 for generating and storing "regular" teletext pages (i.e., pages accessible to everyone). The teletext pages are applied to a teletext inserter 11 and transmitted by a television transmitter 12. A computer 13 is connected to the teletext inserter 11 by means of a connection 14. The connection 14 may be a local connection. The computer 13 may, however, also be present at a completely different location. In that case, connection 14 is a rented data line. The television transmitter 12 transmits a television signal via a broadcast medium 4. The computer 13 is coupled to a public switched telephone network 5.

In the preferred embodiment, the individual receiver 2 comprises a conventional television receiver 6 with an infrared remote control unit 7, a control interface box 8, and a telephone apparatus 9. The control interface box 8 comprises a modem 81 and a microprocessor 82 connected to said modem and further connected to an infrared receiver 83 and an infrared transmitter 84. The control interface box 8 may be integrated in the television receiver 6. In that case, the microprocessor 82 is directly connected to the receiver's internal control circuitry and the infrared receiver 83 and transmitter 84 can be omitted.

The system shown in FIG. 1 operates as follows. The television receiver 6 can be controlled in a conventional manner by aiming the remote control device 7 at the television's infrared receiver 61. It will be assumed that the user has thus tuned the television receiver to television transmitter 12 and activated the teletext mode. One of the regular teletext pages invites him to call a given telephone number, for example, to play a game, consult a horoscope or access a data base. By means of the telephone apparatus 9, a communication path between the user and the service provider's computer 13 is established through the public switched telephone network 5. Further user commands are entered on the remote control device 7 while this device is aimed at the interface box 8. The television receiver is now being controlled by infrared commands issued by the interface box 8. Needless to say that this requires the television receiver 6 and interface box 8 to "see" each other.

Figure 2:
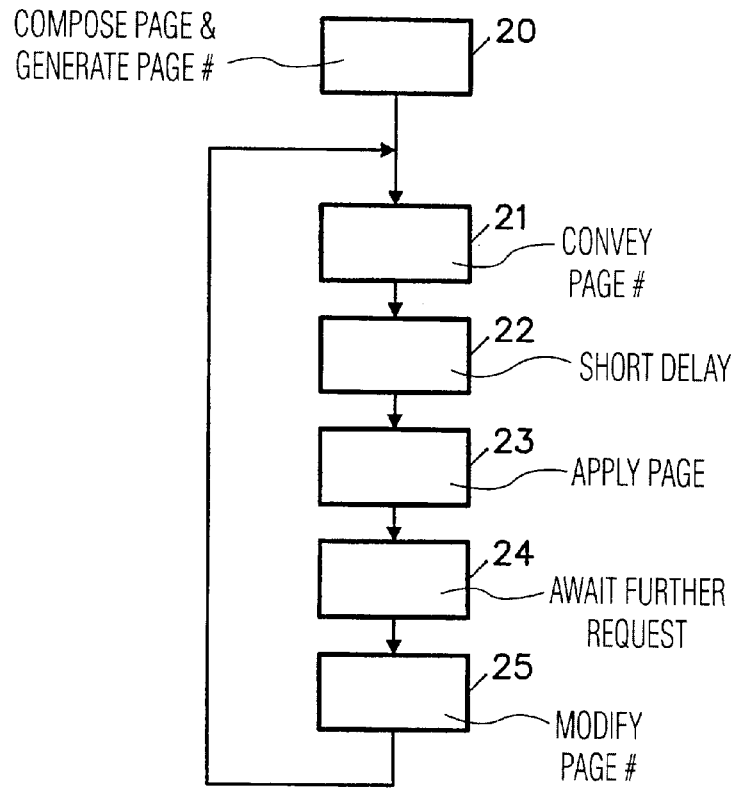
FIG. 2 shows a flowchart of operations performed by a computer at the transmitting end of the system shown in FIG. 1.

FIG. 2 shows a flowchart of operations that are subsequently carried out by the computer 13 at the transmitter end. In a step 20, the computer composes a personal teletext page for the user and generates a page number P for said page. The page number P is a random number in the range 100–899 which is not used for the regular teletext service. In a step 21, the computer conveys the number P to the user through the public switched telephone network 5. In a step 22, the computer enters a waiting loop to create a short delay. As will be explained hereinafter, this delay allows the receiver to process the page number. After the delay, the computer applies the teletext page to the teletext inserter 11 via connection 14 in a step 23. The personal page is now transmitted, in principle once, through the broadcast medium 4 in a further known manner.

The personal page is one of many other pages transmitted by the transmitter 1 and can, in principle, be received and displayed by all receivers, including the receiver 3 of a co-viewer. However, other users are ignorant of the presence of this page. This ignorance can be intensified by activating the "out-of-sequence" control bit in the page header of the personal page. The page number may include a sub-code in which case it is a 7-digit number which can be traced less easily by co-viewers.

In a step 24, the computer awaits further requests from the user. If such a request is received, the computer modifies the page number P in a step 25 and returns to the step 21 so as to communicate the new number to the user through the telephone network and transmit a new page with the modified page number through the broadcast medium.

Figure 3:
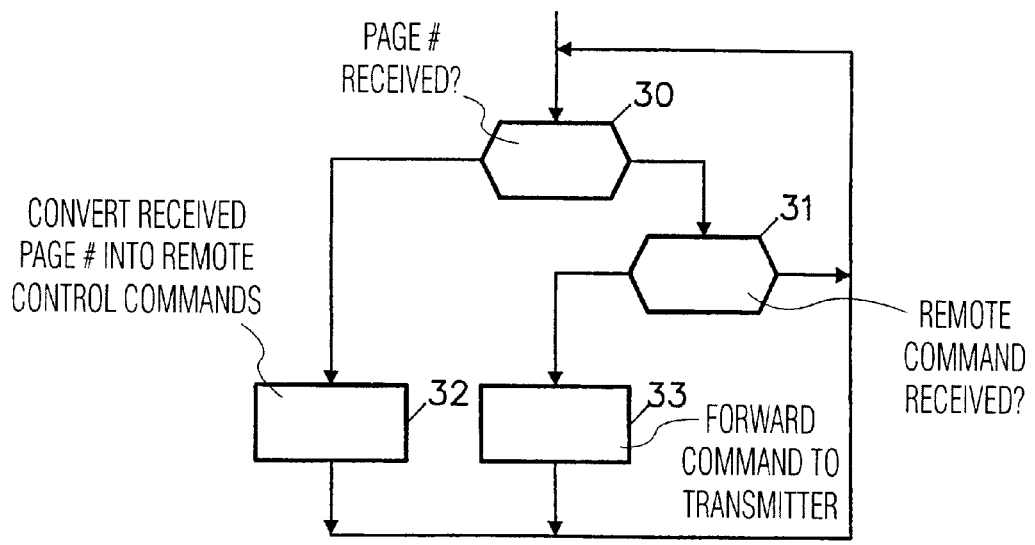
FIG. 3 shows a flowchart of operations performed by a microprocessor at the receiving end of the system shown in FIG. 1.

FIG. 3 shows a flowchart of operations carried out by the microprocessor 82 of interface box 8 at the receiver end. In a step 30, the processor determines whether a teletext page number P is received through the telephone network 5 and the modem 81. In a step 31, the processor determines whether a remote control command is received from the remote control device 7 via the infrared remote control receiver 83. The steps 30 and 31 form a loop which is continuously passed through during the interactive teletext session.

If, in the step 30, a teletext page number is received from the transmitter (cf., the corresponding step 21 in FIG. 2), a step 32 is performed in which the microprocessor converts the received page number P into a sequence of conventional remote control commands and applies the sequence to the infrared transmitter 84. In response thereto, the television receiver is instructed to acquire teletext page P as if the user had manually entered the page number in a conventional manner. It takes some time (of the order of milliseconds) until the new page number has been transmitted to the television receiver. To avoid missing the associated teletext page because the page is precisely transmitted in said time interval, the short delay mentioned before has been introduced in the transmitter.

If, in the step 31, a remote control command is received from the remote control device, a step 33 is performed in which said command is forwarded to the transmitter via the modem 81 (cf. the corresponding step 24 in FIG. 2).

In accordance therewith, the personal pages for an individual user are transmitted with different page numbers, each page number being communicated to the individual receiver in advance. A co-viewer, using the conventional television receiver 3, can merely enter a random page number and hope that a page having that page number will be transmitted. Even if he is successful in receiving a page, he will still not the able to see the sequence of personal pages intended for a particular user.

In summary, an interactive television system is disclosed for selectively retrieving video images or teletext pages from a remote transmitter (1). User requests are communicated to the transmitter through the telephone network (5). The selected images (e.g., teletext pages) are provided with an image address (a personal teletext page number) and transmitted through a broadcast medium (4). A broadcast receiver (6) captures, stores and displays images having a particular address in a further autonomous manner. In order to prevent co-viewers from tracing the image address and thus watching personal information intended for an individual user on their broadcast receivers (3), the image address is modified whenever a new image is transmitted. Prior to transmitting the image, the address is communicated to the individual user through the telephone network and applied (84,61) to the broadcast receiver.

What is claimed is:

1. A method of transmitting images from a transmitter to an individual receiver, comprising the steps:

establishing a communication path between said individual receiver and the transmitter to obtain user selections identifying the images to be transmitted;

assigning an initial image address to the image to be transmitted;

dynamically modifying said initial image address for each successively transmitted image;

broadcasting each image along with each said image address through a broadcast medium;

communicating the assigned addresses to said individual receiver through the communication path prior to broadcasting the respective images; and responsive to control signals from the provider of said images, automatically causing said individual receiver to retrieve said assigned images using said assigned image addresses.

2. A method of receiving selected images from a transmitter, comprising the steps:

establishing a communication path with said transmitter to submit user selections identifying the images to be received; and receiving through a broadcast medium successively transmitted images having respective image addresses that have been created by dynamically modifying an initial image address of a first image; and storing and displaying images having said dynamically modified image addresses on a broadcast receiver;

receiving said dynamically modified image addresses through said communication path; and applying each of said dynamically modified image addresses to the broadcast receiver prior to receiving each corresponding image.

3. A receiver for receiving selected images from a transmitter, comprising:

a communicator for establishing a communication path with said transmitter to submit user selection identifying the images to be received;

an image receiver for receiving images, each said image associated with an image address having been dynamically modified from an initial image address, and for storing and displaying images having said dynamically modified image addresses;

wherein said communicator receives successive image addresses through said communication path and automatically applies each said successive image address to the image receiver prior to receiving each successive image.

4. A receiver as claimed in claim 3, wherein the image receiver is a broadcast television receiver comprising an input for receiving remote control user commands, and the communicator comprises an output for automatically applying the image address to the broadcast receiver in the form of said remote control user commands.

5. An arrangement for interfacing a broadcast television receiver with a transmitter, comprising:

a communicator for establishing a communication path with said transmitter to submit user-selections identifying images to be received by said broadcast television receiver from the transmitter, and to receive image addresses assigned to said images by the transmitter wherein each of said images from said transmitter is associated with an image address having been dynamically modified from an initial image address; and means for automatically, upon receiving successive image addresses applying each of said successive image addresses to the broadcast receiver prior to receiving each successive image.

6. An arrangement as claimed in claim 5, wherein said broadcast television receiver comprises an input for receiving remote control user commands, the arrangement comprising an output for automatically applying the image addresses to the broadcast receiver in the form of said remote control user commands.

* * * * *